United States Patent Office.

ORAZIO LUGO, OF BALTIMORE, MARYLAND.

Letters Patent No. 100,647, dated March 8, 1870.

IMPROVEMENT IN TREATING LIQUORS CONTAINING GELATINE OR GLUE.

The Schedule referred to in these Letters Patent and making part of the same.

Be it known that I, ORAZIO LUGO, of the city and county of Baltimore, State of Maryland, have invented a new and useful Improvement in the Treatment of Liquors containing Gelatine; and I do hereby declare that the following is an exact description thereof.

This invention relates to an improved process for the concentration of liquors containing gelatine or glue by means of currents of air being passed through said liquors, for the purpose hereafter more fully specified.

In order to enable others to apply my invention, I will proceed to describe the same.

The bone liquor, or any other solution containing gelatine desired to concentrate, is placed in a tank or vessel where it can be conveniently heated, either by steam or fire.

Before the liquor has reached its boiling point, currents of air are made to pass through the liquor, in order to expel the required quantity of water, and reach the desired concentration in the shortest possible time.

By the above process it will be found that diluted gelatine solutions can be concentrated in a comparatively short time, and the reduced solution will easily jellify into a strong and hard jelly.

I have obtained jellies which commence to melt or run only at a temperature as high as 156° Fahrenheit.

When it is desired to convert the reduced solution into dry glue, said solution or reduced liquor is left to jellify in the usual manner, cut into pieces and dried. But when it is desired to use the reduced solutions to "ammoniate" fertilizers or guanos, said reduced solution may be mixed with the substance desired to "ammoniate" while in a liquid state, or after the solution has jellified may be granulated or cut into small pieces and then mixed with fertilizers or sold for that purpose.

Instead of heating the above-mentioned liquor with either steam or fire, the currents of air may be heated, when the same result will be obtained.

Having described my invention,

What I claim as new, and desire to secure by Letters Patent of the United States, is—

The process herein described for concentrating solutions containing gelatine or glue, the same consisting in passing currents of air through said solutions or liquors, substantially as set forth.

ORAZIO LUGO.

Witnesses:
 EDM. F. BROWN,
 W. G. HENDERSON.